(12) United States Patent
Kramer

(10) Patent No.: US 6,250,054 B1
(45) Date of Patent: Jun. 26, 2001

(54) DEVICE FOR REMOVAL OF AQUATIC VEGETATION

(76) Inventor: William E. Kramer, 7885 Finch Rd., Wolcott, NY (US) 14590

( * ) Notice: Subject to any disclaimer, the term of this patent is extended or adjusted under 35 U.S.C. 154(b) by 0 days.

(21) Appl. No.: 09/206,755

(22) Filed: Dec. 7, 1998

(51) Int. Cl.⁷ .............................. A01D 7/06; A01D 44/00
(52) U.S. Cl. ...................... 56/8; 56/400.01; 294/50.6; 294/66.1
(58) Field of Search ................ 294/49, 50.6, 52, 294/55, 55.5, 66.1; 56/400.01, 400.04, 400.07, 400.11, 400.21; 172/371, 378, 380; 254/132

(56) References Cited

U.S. PATENT DOCUMENTS

| | | | |
|---|---|---|---|
| 994,796 | * 6/1911 | Stout | 56/400.11 |
| 1,070,868 | * 8/1913 | Worthington | 56/400.11 |
| 1,703,402 | * 2/1929 | Matsuoka | 56/8 |
| 1,902,705 | * 3/1933 | Kee | 294/55.5 X |
| 2,040,751 | * 5/1936 | Marseilles | 172/380 X |
| 2,340,917 | * 2/1944 | Williamson | 172/380 |
| 3,226,149 | * 12/1965 | McJohnson | 294/49 X |
| 4,852,337 | * 8/1989 | Peterson | 56/8 |
| 5,079,905 | * 1/1992 | Bergstrom | 294/66.1 X |
| 5,142,855 | * 9/1992 | Guidarelli | 56/400.21 X |

* cited by examiner

Primary Examiner—Johnny D. Cherry

(57) ABSTRACT

A device for removing aquatic vegetation including a substantially planar member defining a plurality of elongated constricted slots communicating with a marginal edge of the planar member to form a plurality of closely spaced elements for receiving and grasping aquatic vegetation. An elongated handle is connected to the planar member for dragging the planar member in proximity to aquatic vegetation for removal thereof.

8 Claims, 2 Drawing Sheets

DEVICE FOR REMOVAL OF AQUATIC VEGETATION

BACKGROUND OF THE INVENTION

The present invention relates in general to removal of aquatic vegetation, and more particularly to a device which uproots or breaks off aquatic vegetation and grasps such vegetation to enable such vegetation to be readily removed.

In areas of water, such as streams, ponds, coastal water ways, or the like, it is well known that there is a a constant growth of typical aquatic vegetation. Examples of such aquatic vegetation include reeds, grasses, and sea weeds. While aquatic vegetation is not generally regarded as a problem, in places close to residential areas or areas subject to water craft traffic, such vegetation may present a significant hazard. Particularly, the vegetation may become entangled in the propellers or intakes of boat motors and damage such motors; or the vegetation may ensnare swimmers and cause drowning. It is therefore desirable that such aquatic vegetation be easily and readily removed when it would present a potential hazard.

In the past, the attempt to remove aquatic vegetation has been accomplished, in its most rudimentary form, by garden rakes. However, garden rakes are not of a sufficiently strong and durable construction to remove the typical aquatic vegetation due to the fact that such vegetation is generally too well rooted. Other mechanisms employed for accomplishing aquatic vegetation removal include devices, referred to in general as seaweed rakes, that include serrated blades or large knives. These devices, which are generally expensive and of rather complex construction, cut the vegetation, thus leaving the cuttings in the water where they still present potential hazards. Additionally, they do not remove the roots of the vegetation and, as such, the vegetation rapidly grows back even denser to aggravate the potential dangerous conditions.

SUMMARY OF THE INVENTION

In view of the foregoing discussion, this invention is directed to a device for easily and readily removing aquatic vegetation from water areas. The aquatic vegetation removal device includes a substantially planar member defining a plurality of elongated constricted slots communicating with a marginal edge of the planar member to form a plurality of closely spaced elements for receiving and grasping aquatic vegetation. An elongated handle is connected to the planar member for dragging the planar member in proximity to aquatic vegetation for removal thereof.

The invention, and its objects and advantages, will become more apparent in the detailed description of the preferred embodiments presented below.

BRIEF DESCRIPTION OF THE DRAWINGS

In the detailed description of the preferred embodiments of the invention presented below, reference is made to the accompanying drawings, in which.

DETAILED DESCRIPTION OF THE INVENTION

Figure 1:
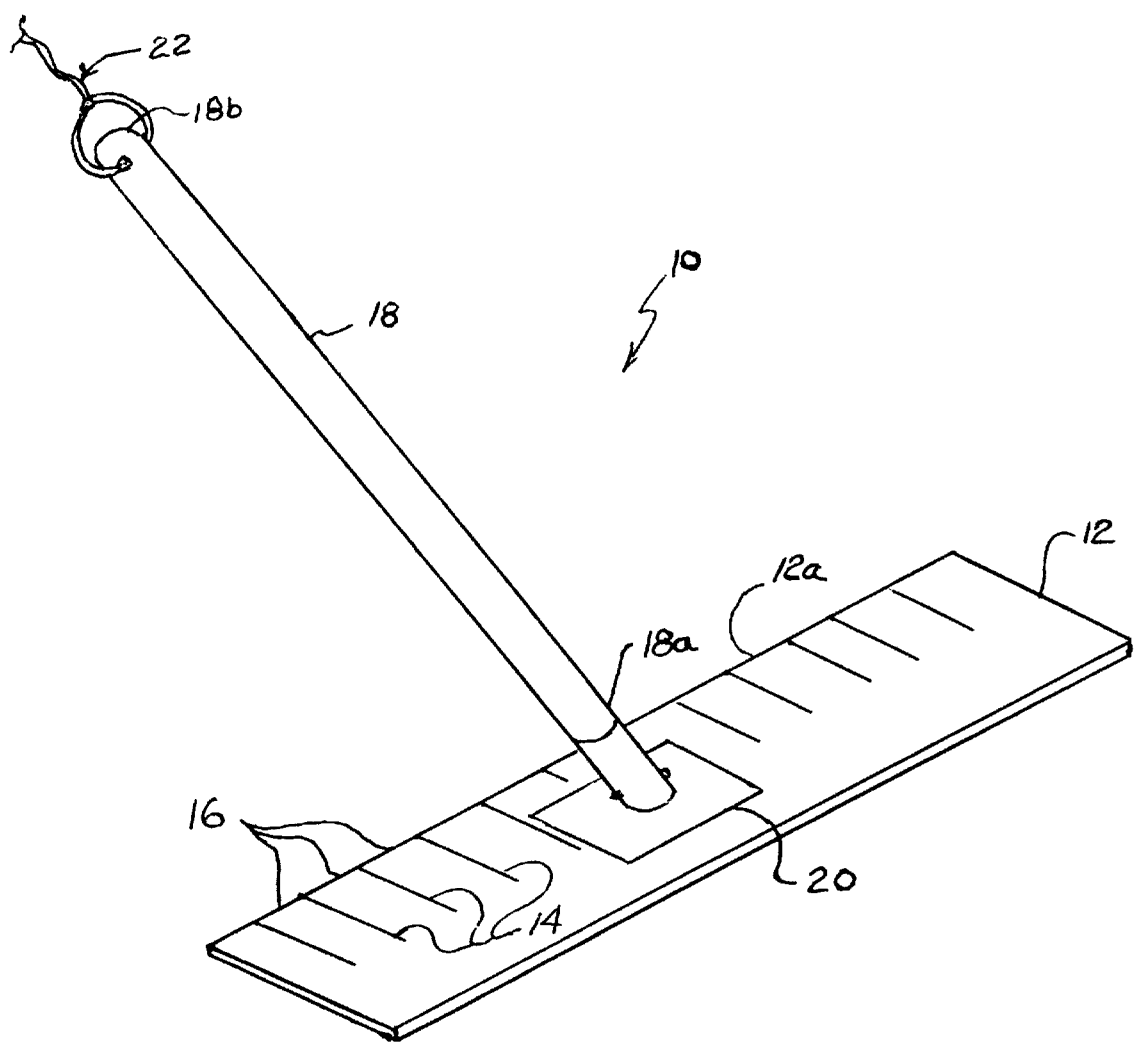
FIG. 1 is view, in perspective, of the aquatic vegetation removal device, according to this invention.

Referring now to the accompanying drawings, FIG. 1 shows the aquatic vegetation removing device, designated generally by the numeral 10, according to this invention. The aquatic vegetation removing device 10 includes a substantially planar member 12. The planar member 12 defines a plurality of elongated constricted slots 14 communicating with a marginal edge 12a of said planar member. As such, a plurality of closely spaced elements 16 are formed for receiving therebetween and grasping aquatic vegetation, within the constricted slots 14, as further described hereinbelow.

Figure 2:
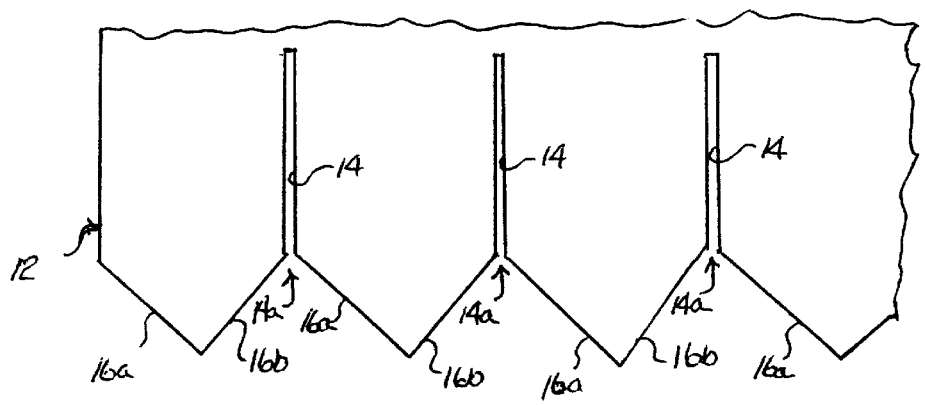
FIG. 2 is top elevational view, on an enlarged scale, of a portion of the planar member of the aquatic vegetation removal device as shown in FIG. 1.

The aquatic vegetation removing device 10 is constructed such that the closely spaced elements 16 have a limited degree of flexibility, both in the direction perpendicular to the plane of the planar member 12 and in the direction perpendicular respectively to the longitudinal axes of the slots 14. This aids in providing the necessary constriction for the slots 14. For example, the planar member may be constructed of 18 gauge sheet metal (approximately 0.1 cm thick), with the respective constricted slots being approximately 4.50 cm long and 0.2 cm wide, the slots spaced at 1.25 cm intervals. Further, the respective ends of said closely spaced elements 16 at the marginal edge 12a of the planar member 12 have an undercut portions 16a, 16b (see FIG. 2). The undercut portions 16a, 16b serve to form a V-shaped entry 14a to the elongated constricted slots 14, respectively. Of course, the planar member 12 and the elongated constricted slots 14 and closely spaced elements 16 may be formed by molding such construction from a plastic material.

An elongated handle 18 is connected at an end 18a thereof to the planar member 12 by any appropriate bracket connection 20. The handle 18 may be made of wood, or any other suitable material, which is light weight and has a tendency to float. Typically the handle is approximately 2.5 m long. The handle 18 may have an extensible portion 22 to extend the overall each of the aquatic vegetation removing device 10. The extensible portion 22 is shown in FIG. 1 as being a rope fixed to the end 18b of the handle remote from the end 18a of the handle connected to the planar member 12. Of course, the handle and extensible portion could be constructed to be of the telescoping wand type.

With the aquatic vegetation removing device 10 constructed in the described manner, the operation thereof is as follows. The planar member 12 is dragged, by the handle 18, through the water area containing aquatic vegetation desired to be removed. The vegetation is directed by the V-shaped entries 14a, of the constricted slots 14, into the slots between the closely spaced elements 16. Of course, for an extended reach for the device 10, the extensible portion 22 of the handle 18 can be utilized. For example, the device can be thrown out into the water, where the planar member 12 will sink and the handle 18 will float. Pulling on the rope of the extensible portion 18a will drag the planar member along, removing vegetation, until the handle is close enough to be reached.

The vegetation is wedged in the constricted slots 14 to be grasped by the spaced members 16. Continued dragging of the planar member 12 uproots most of the vegetation (a small portion is broken off). The vegetation grasped by the elements 16 can then be easily and readily removed from the water. Accordingly, the removed vegetation is not left in the water as a potential hazard; and, since most of the roots are removed, the vegetation will not rapidly return. The vegetation grasped by the elements 16 can easily be removed therefrom manually for example.

Figure 3:
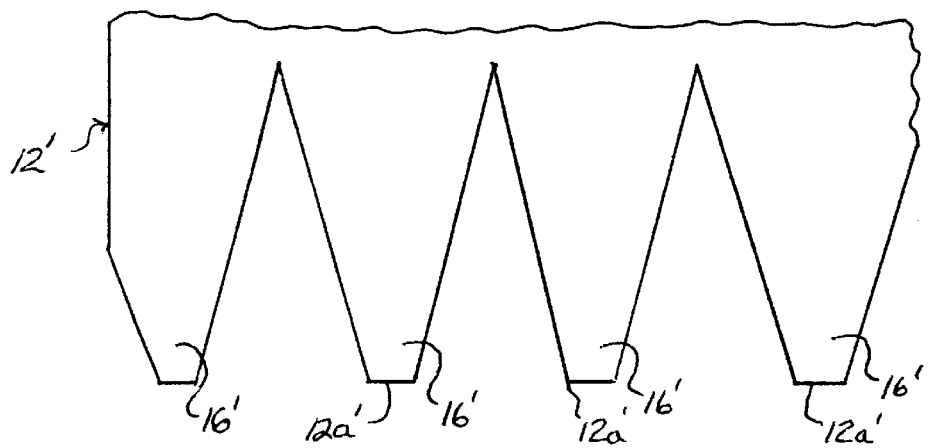
FIG. 3 is top elevational view, similar to FIG. 1, of a portion of an alternate embodiment of the planar member of the aquatic vegetation removal device.
Figure 4:
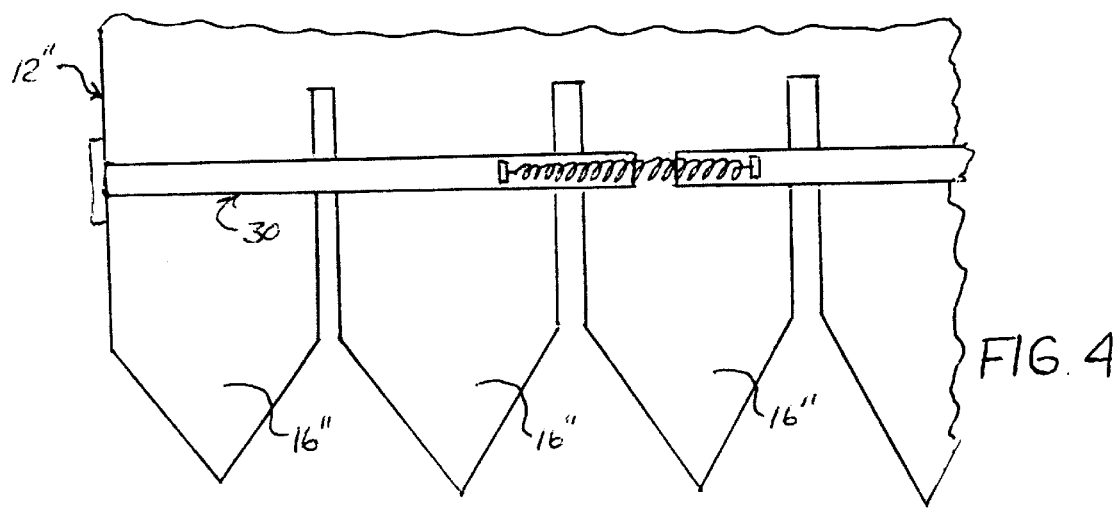
FIG. 4 is top elevational view, similar to FIG. 1, of a portion of another alternate embodiment of the planar member of the aquatic vegetation removal device

Alternate embodiments for the planar member 12 of the aquatic vegetation removing device 10 are shown in FIGS. 3 and 4. For the alternate embodiment for the planar member shown in FIG. 3, designated by the numeral 12', the closely spaced elements 16' are respectively tapered from a narrow end at said marginal edge 12a' of the planar member to a wider end remote therefrom. This arrangement will accommodate an increased amount of vegetation for removal, and will ensure that the slots have the necessary constriction to properly grasp the aquatic vegetation for removal.

For the alternate embodiment for the planar member shown in FIG. 4, designated by the numeral 12", the planar member includes a mechanism 30, such as a spring clamp for example, for applying a force to the closely spaced elements 16" to urge such elements toward one another in the plane including the planar member. Once again, this arrangement will accommodate an increased amount of vegetation for removal, and will ensure that the slots have the necessary constriction to properly grasp the aquatic vegetation for removal. Furthermore, when the force of the mechanism 30 urging the closely spaced elements toward one another is overcome, such as by simply releasing the spring clamp, the closely spaced elongated members can be spread apart to facilitate removal of aquatic vegetation from therebetween.

The invention has been described in detail with particular reference to preferred embodiments thereof, but it will be understood that variations and modifications can be effected within the spirit and scope of the invention as set forth in the claims.

What is claimed is:

1. A device for removing aquatic vegetation, said device comprising:

a substantially planar member, said planar member defining a plurality of elongated constricted slots communicating with a marginal edge of said planar member to form a plurality of closely spaced elements with a limited degree of flexibility for receiving and grasping aquatic vegetation, said closely spaced elements at said marginal edge said planar member have an undercut portion so as to form a V-shaped entry to said elongated constricted slots respectively; and an elongated handle connected to said planar member for dragging said planar member in proximity to aquatic vegetation whereby such aquatic vegetation is grasped by said closely spaced elements for substantially complete uprooting thereof and subsequent ready removal.

2. The aquatic vegetation removing device of claim 1 wherein said closely spaced elements are respectively tapered from a narrow end at said marginal edge of said planar member to a wider end remote therefrom.

3. The aquatic vegetation removing device of claim 1 further including means for applying a force to said closely spaced elements to urge said elements toward one another in the plane including said planar member.

4. The aquatic vegetation removing device of claim 3 wherein said urging means includes a spring.

5. The aquatic vegetation removing device of claim 4 further including means for overcoming said force of said urging means to enable said closely spaced elongated members to be spread apart to facilitate removal of aquatic vegetation from therebetween.

6. The aquatic vegetation removing device of claim 1 wherein said closely spaced elements are formed by molding said planar member from a plastic material.

7. The aquatic vegetation removing device of claim 1 wherein said handle has an extensible portion to extend the overall reach of said device.

8. The aquatic vegetation removing device of claim 7 wherein said extensible portion includes a rope fixed to the end of said handle remote from the end of said handle connected to said planar member.

\* \* \* \* \*